United States Patent [19]

Haase

[11] Patent Number: 5,276,062

[45] Date of Patent: Jan. 4, 1994

[54] HPLC AVIDIN MONOMER AFFINITY RESIN

[75] Inventor: Ferdinand C. Haase, Chalfont, Pa.

[73] Assignee: Rohm and Haas Company, Philadelphia, Pa.

[21] Appl. No.: 702,433

[22] Filed: May 16, 1991

Related U.S. Application Data

[63] Continuation of Ser. No. 414,785, Sep. 29, 1989, abandoned.

[51] Int. Cl.$^5$ .................... C08J 5/20; B01D 15/08
[52] U.S. Cl. ........................ 521/25; 521/28; 530/86; 210/198.2; 210/635; 210/502.1; 210/656
[58] Field of Search .............. 530/816; 210/198.2, 210/635.1, 502.1, 656; 502/403; 521/28, 25

[56] References Cited

U.S. PATENT DOCUMENTS

| | | | |
|---|---|---|---|
| 4,119,589 | 10/1978 | Horn et al. | 530/816 |
| 4,382,124 | 5/1983 | Meitzner et al. | 521/38 |
| 4,656,252 | 4/1987 | Giese | 530/816 |
| 4,687,820 | 8/1987 | Hou et al. | 40/656 |
| 4,732,811 | 3/1988 | Margel | 428/403 |
| 4,874,813 | 10/1989 | O'Shannessy | 525/54.1 |
| 4,883,598 | 11/1989 | Riethorst et al. | 210/656 |

FOREIGN PATENT DOCUMENTS

| | | | |
|---|---|---|---|
| 64-3129 | 1/1989 | Japan | 502/403 |

OTHER PUBLICATIONS

C.A.105:38449c P. Boorsma et al.
C.A.101:125604k J. Goodson et al.
Tandman et al J. Chem. Ed. vol. 53, No. 9 pp. 591–592.
Polymer Letters vol. 3, pp. 505–508 (1965).
Bio Techniques, vol. 3, No. 6 (1985) pp. 494–501.
Analytical Biochemistry 94, 366–370 (1979).
Journal of Chem. Ed., vol. 53, No. 9, Sep. 1976, 591.
Biochem Journal, vol. 250, 291 (1988).
Science, pp. 85–87, Jan. 1989.
Proc. Natl. Acad. Sci., vol. 86, 2190 (1989).
J. Fermentation and Bioengineering, vol. 70, 199 (1990).
Proc. Natl. Acad. Sci. USA, vol. 82, pp. 5617–5621 Sep. 1985.
Methods Enzymol., vol. 13, pp. 215–231 (1969).
Journal of Chromatography, 363 (1986) 231–242.

*Primary Examiner*—Thurman K. Page
*Assistant Examiner*—Peter F. Kulkosky
*Attorney, Agent, or Firm*—James G. Vouros; Thomas J. Howell

[57] ABSTRACT

Novel, improved ligand-containing media, a method of preparation and use in the production of peptides, proteins, and the like, by chromatographic separation, and more specifically media having permanently attached via a covalent bond to an inert solid substrate an avidin polypeptide ligand in the dissociated renatured form which reversibly binds to certain molecules such as proteins, peptide, nucleotides, oligonucleotides, and the like and to other molecules which bind to avidin via biotinylation or by way of their secondary/tertiary micromolecular structures.

13 Claims, No Drawings

HPLC AVIDIN MONOMER AFFINITY RESIN

This application is a continuation, of application Ser. No. 414,785, filed Sep. 29, 1989, now abandoned.

BACKGROUND OF INVENTION

The present invention relates to improved ligand-containing media, their method of preparation and use in the production of peptides, proteins, and the like, by chromatographic separation. In a preferred embodiment the invention comprises media having permanently attached via a covalent bond to an inert solid substrate an avidin polypeptide ligand in the dissociated renatured form which reversibly binds to certain molecules (proteins, peptides, nucleotides, oligonucleotides, and the like) and other molecules which bind to avidin via biotinylation or by way of their secondary/tertiary micromolecular structures.

The production of certain peptides and proteins for use in human health, animal health, industrial, food, and agricultural markets has been hampered by high cost and scarcity, particularly in the health care area. Peptides and proteins for human health uses are naturally synthesized by living organisms for their own needs and until recently, animals, plants, cadavers, serum and urine were the only sources from which these valuable biomolecules could be obtained. For example, porcine or bovine insulin was extracted from the pancreas of pigs or cattle for use by diabetics and HGH (human growth hormone) was obtained in small quantities from cadavers to treat infantile dwarfism. These biomolecules were usually obtained in very small quantities because only limited amounts were produced biologically or they were rapidly degraded by enzymes in their environment. Two new technologies have been developed which make possible the production of almost any peptide or protein in relatively large quantities: chemical and biological synthesis.

The chemical route is achieved by solid phase (Merrifield technique) and solution phase peptide synthesis; this approach is usually limited to peptides of less than 20 amino acid residues. Biological synthesis uses genetic engineering and recombinant DNA technologies and production of cells in tissue cultures or by microbial fermentation. The biological route has been the only practical approach to the production of higher molecular weight peptides in relatively large quantities.

Since interest in these biomolecules is based on their performance, purification of the desired biomolecule becomes a very important factor, especially in the health care and food additive industries, where the cost of purification alone, usually involving multiple process steps, can represent more than half of the total cost of producing the desired biomolecules.

The prior art has taught many techniques for covalently binding materials such as proteins to solid substrates as a technique for separating the bound species. For example, U.S. Pat. No. 4,732,811 (granted Mar. 22, 1988) describes the use of polymers containing polyaldehyde groups as capable of binding compounds containing primary amino groups (e.g., protein, antibodies and drugs).

Regardless of the synthetic route used, purification is necessary and liquid chromatography has been the universal tool used for these bioseparations. Among the chromatographic approaches available (ion exchange, size exclusion, reverse phase, hydrophobic interaction, and affinity), affinity chromatography has the potential for significantly reducing the number of purification steps required. Affinity columns based on avidin are known as being useful for the isolation of various biomolecules (D. A. Fuccillo, *Biotechniques*, 3 (6), 494–501 (1985)). In particular, avidin-biotin interactions have been applied to the isolation of proteins from biological synthetic routes. Avidin is a basic high-molecular weight glycoprotein found in egg whites; biotin is a low-molecular weight molecule with a fused imidazole-thiophene ring system which acts as a tag for recognition by avidin, resulting in an extremely stable avidin-biotin complex. Since the synthetic route chosen usually requires isolation of the desired biomolecule from very low concentrations in its environment, the extremely high affinity of avidin for biotin has been exploited in the chromatographic concentration and isolation of biotin-tagged ("biotinylated") molecules by use of avidin affinity columns. The specificity and affinity of avidin (native tetrameric form of 4 identical subunits) for biotin is extremely high and chromatography columns based on this principle have been used for analytical purposes. However, proteins and peptides containing the biotin-tag can not be recovered from an avidin tetramer column without using harsh conditions which invariably destroy the very biomolecule being isolated. Attempts to overcome the strong binding of biotin by avidin without losing the high specificity for binding biotinylated molecules have concentrated on using solid supports to stabilize the dissociated form of avidin; however, these columns have not been satisfactory for preparative use because of the presence of several classes of binding sites with less than desirable binding capacities as well as other deficiencies associated with the particular solid support matrices used (KP Henrikson, et al., *Analytical Biochemistry*, 94,366–370 (1979)).

Various routes have been used to anchor the avidin moiety to a solid support. Most commonly, agarose activated to a proper form for covalent coupling of the primary amino groups of avidin is used as a support (A. D. Landman, et al., *J. Chem. Educ.*, 53 (9), 591 (1976)). However, these covalent linkages have not proven satisfactory due to chemical instability and resultant leaching of the avidin from the support, thus reducing the operational life of the column and also contaminating the purified product sought. Other major disadvantages of these particular columns include nonspecific adsorption of proteins, compressibility of the column matrix at high liquid flow rates resulting in back pressure and reduced flow, and the sensitivity of agarose to microbial degradation. In addition, agarose materials are not susceptible to easy cleaning and sterilization. Other supports based on polystyrene or silica (Japanese Kokai Patent Application JP 64-003129 A) have been used, but these suffer from even lower binding capacities than does agarose as well as incompatibility with certain biologically important ions.

For these reasons there is a need for a purification medium which allows efficient separation and subsequent isolation of biologically important molecules in a form satisfactory for the critical needs of such fields as health care and food additives.

The terms "adsorption" or "chromatographic adsorption" are intended in the specification and the appended claims in a broad, but perhaps not entirely pure technical, sense to embrace any form of binding between chemical species, other than covalent binding. Thus, binding by affinity or Van der Walls forces, while technically distinguishable, are both intended to be included within the broad meaning of "adsorption" as used herein.

SUMMARY OF INVENTION

It is an object of this invention to provide a method of isolation of synthetic or natural molecules, and/or biotinylated derivatives thereof, by adsorption of said molecules onto novel affinity media containing avidin fixed to a solid inert support. It is a further object to use compositions for the affinity media which are based on chemically stable, non-hydrolyzable linkages of avidin to a polymeric substrate. These objects, and others which will become apparent from the following disclosure, are achieved by the present invention which is, in one aspect, a media remarkably useful for isolating biotinylated molecules, comprising an inert, crosslinked polymeric substrate having covalently bonded thereto through a non-hydrolyzable linkage of the formula —$NH_2CH_2$—, an avidin polypeptide ligand in the dissociated renatured monomeric form. In another aspect, the invention provides an improved process for the preparation of avidin affinity media which comprises reacting an excess of avidin with a polymeric substrate containing reactive formyl functional groups, chemically reducing the imino bonds to stable amine linkages, and chemically denaturing and renaturing the bound avidin to its monomeric form. A still further aspect of the invention is an improved, process for separating synthetic or natural molecules from a fluid mixture, such as fermentation broth or reaction mixture, containing various by-products and impurities as well as the molecules, by means of adsorption elution using the novel media of this invention.

As contained herein and in the appended claims, the term "column" is used in the broad sense to define a container which holds adsorption media. Typically, in chromatographic separations, the columns are made of glass, silica, stainless steel or the like and are in the form of hollow tubes (or capillary fibers) often wound in a spiral, or long cylindrical tubes having, at opposition ends, inlet and outlet means. In preparative chromatography or industrial separations the column may be a vertical vessel, usually cylindrical, for housing a stationary bed of adsorbent. The present invention is suitable for use with any particular column configuration.

Prior art avidin-tetramer columns containing bound enzymes/proteins have limited lifetimes due to loss of activity ("fouled" resin) at which point the entire resin must be discarded due to the irreversible binding of the enzyme in question. However, when avidin-monomer affinity columns of the present invention are used to immobilize enzymes, the column can be regenerated easily upon any loss of enzyme activity because of the reversibility of the avidin-monomer/enzyme complex.

DETAILED DESCRIPTION OF INVENTION

We have discovered a novel affinity chromatography composition, an improved process for preparation of the chromatographic media, and new uses of the novel media which allow unexpected and surprising improvements in the isolation and purity of natural and synthetic biomolecules.

Preparation of the avidin monomer affinity media by the present invention is based on the attachment of avidin to a compatible chemically inert substrate through a chemically stable linkage which will not degrade or dissociate during subsequent chemical treatments which are necessary to release bound biomolecules. Suitable inert solid substrates for the improved media of the present invention include a wide range of polymeric and inorganic solids. Preferably, the substrates should be highly inert, porous and particulate (spherical preferred). A well-known and highly preferred type of substrate is the porous crosslinked organic polymeric adsorbent or ion exchange resin having a precipitated or macroreticular structure. This type of particle is commonly used in chromatographic separations as well as industrial purification techniques. Illustrative materials are the Toyopearl resins (TM of TOSOH, Japan) and Amberlite XAD series of polymers (TM of Rohm and Haas Co., USA). Acrylic and styrene-based polymers and copolymers of very high porosity and surface area are a most preferred class of substrates (see, for example, U.S. Pat. No. 4,382,124). Of the less preferred substrates may be mentioned, glass beads, silica, gel polymers, and the like.

Suitable linking groups used to covalently bind avidin to the solid substrates include: —$CH_2NH$—, —$CONH$—, —$NHC(O)NH$—, —$C(O)NHNH-C(O)NH$— and —$SO_2NH$— wherein the —NH— moiety on the right side of the aforesaid groups is contributed by the avidin. A highly preferred type of linkage involves the reduced imino group of the formula —$NHCH_2$—. Linking groups may also include alkylenes cycloalkyl, aryl, aralkylene, or carboxyl, hydroxy or alkoxy substituted derivatives thereof as spacer structures between the backbone of the polymeric substrate and actual linking site of the avidin molecule. Representative structures would include: —$NH(CH_2)n$, —$NH(CH_2)nC_6H_4$—, where n=1 to 4, preferably where n=1 or 2. Linkage may involve any number of the amino groups found in the avidin polypeptide, e.g., the E-amino group of lysine, the imidazole group of histidine, or any of the α-amino groups of the N-terminal aminoacids. Equations I and II illustrate the chemical reactions which take place to form the linkage between avidin and the polymeric substrate (in this case, containing formyl groups).

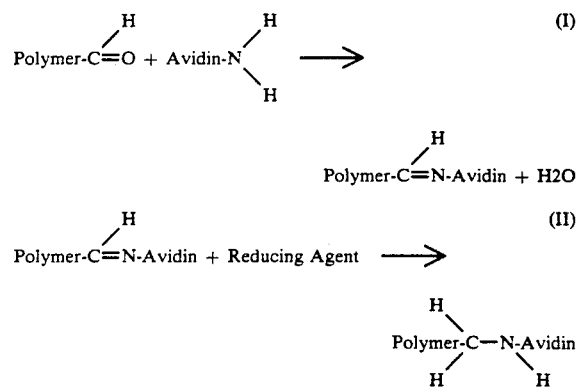

The amino groups of avidin chemically react with appropriate functional groups positioned on the aforementioned polymeric substrate, e.g., formyl groups, to produce the intermediate imino linkage, —CH=N—, which is subsequently treated with an appropriate reducing agent to produce the chemically stable amine linkage of the formula —$CH_2NH$—. Suitable reducing agents typically include methyl hydride complexes, $NaCNBH_3$, $NaBH_4$, $H_2$, and $BH_3$. Preferably, salts of cyanoborohydride are used to perform the reduction to the amino linkage.

An important characteristic of the avidin affinity medium is the nature of the avidin units bound to the inert support. Avidin occurs naturally in a tetrameric form with four identical subunits, each consisting of 128 aminoacid residues, six mannose residues, and three glucosamine residues, for a combined molecular weight of approximately 68,000. Tetrameric avidin, even when bound to a polymeric substrate, such as agarose (a polysaccharide), forms extremely stable complexes with biotinylated molecules (dissociation constant, K(d), of $10(-15)$), rendering bound biotinylated enzymes, peptides, and the like, almost impossible to recover in high yields and purity due to the chemically aggressive reactions which must be used to release the bound biotinylated molecules from their complexes with the tetrameric avidin media. It is, therefore, a characteristic of the present invention that a predominant amount of the bound avidin be present in its monomeric form, in which the dissociation constant for the avidin-biotin complex is considerably greater than $10(-15)$, preferably greater than $10(-10)$, and most preferably, between $10(-9)$ and $10(-7)$. It is believed that the unique combination of the chemically stable linkage of the avidin to the polymeric substrate, chemical structure of the substrate (hydrophobic interactions, hydrogen bonding, and the like), and the physical structure of the substrate (porosity, crosslinking level, and the like) are responsible for establishing the spatial constraints on a molecular level which maintain the bound avidin in its monomeric form where its high specificity for the biotin group is maintained, while the greater dissociative characteristics of the monomeric avidin-biotin complex make isolation and recovery of biotinylated molecules truly reversible.

The process for preparing the novel monomeric avidin affinity media of the invention is based on the introduction of the chemically stable amino linkage between the substrate and avidin, followed by well known denaturing and renaturing treatments which produce the final bound-monomeric avidin affinity medium. The first stage of the process involves the reaction of avidin (normally an excess) with the functional groups of the polymeric substrate. The parameters which control the extent to which the avidin is bound to the substrate in this step include time, pH, temperature, concentration of reactants (avidin, substrate functional groups, reducing agent), and composition of substrate.

Reaction temperatures are limited due to the sensitivity of most proteins to moderate temperatures; however, avidin is extremely temperature insensitive and a range of 5 to 35 C. may be typically used; since most reactions proceed more slowly at reduced temperatures, 20-25 C. is used to take advantage of the faster rates allowed by avidin's good temperature stability. Reaction times of less than 10 hrs result in lower levels of avidin fixation, while times in excess of 15 hrs do not appreciably increase the fixation of avidin. Reaction times of 24 hrs may be used to ensure maximum avidin uptake without encountering counterproductive side reactions.

A pH range of 5 to 10 may be used to carry out the avidin fixation reaction. The range of 6.5 to 8 is most suitable for balancing the tendency of charged functional groups present in the protein to form intramolecular bonds and the need to maximize the concentration of free unprotonated amino groups for reaction with the substrate formyl groups. A suitable buffer which maintains the pH in this region is preferable, with pH 6.5-7.5 being most preferable.

The concentration of avidin (mg/mL resin) charged to load the protein onto the substrate containing formyl functional groups may range from 0.5 to 10 mg/mL. Concentrations of 2 to 5 mg/mL are preferred in that the ratio of tetrameric avidin to amino linkages is maintained such that subsequent conversion to bound monomeric avidin is favored. The concentration of formyl groups in the substrate polymer may vary over a wide range: 10 to 100 $\mu$moles —CHO/mL resin; concentrations of 35-70 $\mu$moles/mL are preferred in that a good balance is established regarding the number of amino linkages created between the polymeric substrate and the bound avidin while maintaining the spatial constraints within the avidin-polymer matrix which allow ready conversion to the monomeric form of the bound avidin. The concentration of reducing agent may vary from an equimolar to a tenfold molar excess in relation to the formyl group concentration. Molar ratios (reducing agent/formyl group) in excess of 5 result in less of the bound avidin being converted to its monomeric form; ratios from 1-3, corresponding to about 3-10 mg reducing agent/mL (when using sodium cyanoborohydride at formyl group concentrations of 55 moles/mL, for example), represent a preferred range with regard to converting the bound avidin to its monomeric form.

Conversion of the bound avidin from its tetrameric form to the monomeric form is accomplished by conventional denaturing/renaturing treatments using a variety of reagents: such as aqueous DMSO, urea, lithium chloride, guanidine HCl. Preferably, a solution of guanidine hydrochloride, containing about 10% vol/vol acetic acid, pH 2, may be used to convert the bound avidin into its monomeric form.

Isolation and purification of natural and synthetic molecules using the avidin affinity media may be achieved by contacting aqueous or organic mixtures containing the desired target molecule together with other undesirable constituents with particles containing the composition of the present invention, i.e., bound monomeric avidin. Proteins, peptides, enzymes, nucleotides, oligonucleotides, and their corresponding biotinylated recombinant versions may be isolated and purified, and quantitated for analytical purposes using avidin affinity chromatography. In addition the novel affinity media may be used for: the localization and separation of antigens, development of immunoassay techniques, and production purification and/or recovery of DNA or RNA or purified probe molecules for hybridization studies, and purification or sequencing of genetic information from a variety of organisms, or other applications which would benefit from the use of avidin affinity chromatography.

The avidin affinity media may be used in several forms to achieve the aforementioned separations. Most commonly, media would be used in the form of particulate beads, ranging in size from 5 microns up to about 1000 microns. In addition, the media may be used either in a column operation or a batch mode. For example, in the batch mode, fermentation broths of recombinant proteins may be treated with a quantity of the avidin affinity media to remove secreted proteins of interest; the treated fermentation broth may be recombined with other streams to be treated (recycled) to remove as much of the target molecules as possible. Batch mode operation is particularly useful for the preparative scale isolation of relatively large quantities of biomolecules. On the other hand, the column mode of operation is preferably used for analytical and preliminary evaluation purposes as well as small scale preparative needs.

Once the target molecule has been isolated, i.e., concentrated onto the avidin affinity medium, it must be removed from the media and separated. This step is carried out by any number of conventional processes, which are well known to those familiar with bioseparations. Among the processes used to elute target molecules from the affinity media are treatment with solutions of urea, glycine, acetic acid, varying salt content, biotin, varying pH, and the like.

Target molecules which may be isolated and purified by use of the avidin affinity media possess one of several characteristics which allow the separation to take place. One characteristic is the presence of the biotin group in the molecule to be isolated. D(+)Biotin (Structure I), also known as Vitamin H or coenzyme R, has a molecular weight of 244 and chemically reacts (by known reactions) through its carboxyl group with the amino groups of enzymes, peptides, proteins, and the like, to anchor itself to the target molecule through the resultant amide linkage (Equation II). Other forms of Biotin e.g., imino biotin or lipoic acid can also aid in the separation of biomolecules.

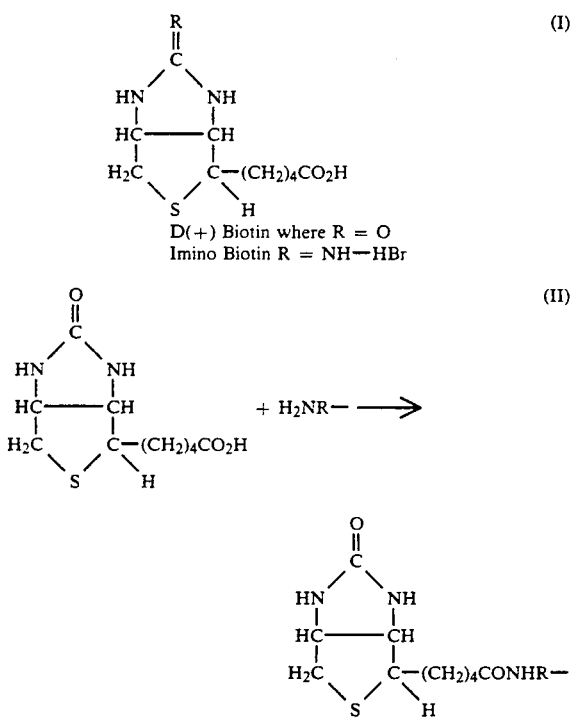

The resultant molecule of Equation II is now biotinylated, i.e., it contains the biotin group. The biotin group acts as an identifier when this molecule is then exposed to the avidin monomer affinity medium; the strong complexation of avidin with biotin causes the biotinylated molecule to be absorbed onto the medium and thus separated from all other non-biotinylated molecules present in the particular mixture. Conventional methods (discussed previously) are then used to remove the biotinylated molecule.

In order to more fully illustrate the nature of this invention and the manner of practicing the same, the following examples are presented. These examples represent just a few of the many uses and compositions of the invention; they are intended to be illustrative but not limiting. Various modifications, alternatives, and improvements should become apparent to those skilled in the art without departing from the spirit and scope of the invention.

EXAMPLE 1

General Procedure for Preparing Avidin Affinity Columns

Acrylic resin (particle size: 44–88μ) containing 55 μmole formyl (—CHO) groups/mL resin, AF—formyl Toyopearl(TM) 650M (TOSOH) was placed on a sintered glass filter and washed with approximately 10 bed volumes of 100 mM potassium phosphate buffer solution (pH=7.5); the wet resin was transferred to a polypropylene bottle. Purified avidin (Sigma Chemical Co.) was weighed out and dissolved in 100 mM phosphate buffer solution (pH=7.5); final avidin concentration was measured by absorbance values at 282 nm (E(1%)=15.5). Avidin (4.0 mg/mL resin) was added to the prewashed resin in the polypropylene bottle, the mixture stirred gently for 10–15 minutes, and sodium cyanoborohydride (7.5 mg/mL resin) was then added. The bottle was capped and placed in a horizontal shaker (slow speed) maintained at 23–25 C. for 24 hrs. The modified resin was then transferred to a column and then washed with 100 mM potassium phosphate buffer at pH=7.5, the eluate recovered and measured for unbound avidin (absorbance method); the total amount of resin-bound avidin was then calculated by difference.

The avidin-loaded resin was then washed with 4M guanidine HCl solution containing 10% acetic acid (vol/vol), pH 2, to dissociate the tetrameric avidin into its monomeric form. Eluates were collected and the amount of avidin removed from the resin was determined via absorbance readings. The avidin monomer affinity resin was then slurry packed into HPLC columns (Upchurch Scientific, Inc.) for subsequent use in the purification of proteins.

EXAMPLE 2

Evaluation of Avidin Monomer Affinity Column Performance

Total biotin binding capacity was estimated by calculation of the amount of avidin monomer immobilized per ml of resin. Biotin binding affinities and capacities were determined using D-($^{14}$C) biotin. Crude extracts of 24 hr cultures of *E. coli* containing the plasmid ptac 1.3 t were used to determine the binding capacity for biotinylated peptides (V. L. Murtif, et al, Proc. Natl. Acad. Sci., USA 82, 5617-5621 (1985)) and to evaluate the column regarding purification of recombinant proteins.

Characteristics of resin evaluated:
Avidin monomer capacity (calc)=74.9 nmoles/mL
Total $^{14}$C biotin binding capacity=58.7 nmoles/mL
Reversible $^{14}$C binding capacity=51.2 nmoles/mL
Revesible Biotinylated protein (1.3S$_e$) cap=68.4 nmoles/mL Approximately 78% of resin immobilized avidin binds biotin and 87% of these do so reversibly; with the 1.3S$_e$ peptide, 91% of the avidin showed reversible binding capability, indicating almost complete conversion of avidin to the monomeric form (reduced/reversible binding).

EXAMPLES 3-6

Various Conditions Used to Prepare the Avidin Affinity Columns

In a manner similar to that described in Example 1, different avidin affinity columns were prepared under a variety of conditions and evaluated for their effectiveness in binding proteins (according to Example 2). Concentrations are expressed per mL of resin.

EXAMPLE 3

In a manner similar to that described in Example 1, an acetate buffer was used (pH 5.5), avidin was added at 2.3 mg/mL, and sodium cyanoborohydride was added at 7.5 mg/mL. Characteristics of resin obtained:
Avidin monomer capacity (calc) = 57 nmoles/mL
Protein $1.3S_3$ binding capacity = 21.5 nmoles/mL

EXAMPLE 4

In a manner similar to that described in Example 1, a phosphate buffer was used (pH 7.5), avidin was added at 4.0 mg/mL, and sodium cyanoborohydride was added at 7.6 mg/mL:
Characteristics of resin obtained:
Avidin monomer capacity (calc) = 75 nmoles/mL
Protein $1.3S_e$ binding capacity = 64 nmoles/mL

EXAMPLE 5

In a manner similar to that described in Example 1, a phosphate buffer was used (pH 6.5), avidin was added at 3.85 mg/mL, and sodium cyanoborohydride was added at 23.0 mg/mL:
Characteristics of resin obtained:
Avidin monomer capacity (calc) = 161 nmoles/mL
Protein $1.3S_e$ binding capacity = 115 nmoles/mL

EXAMPLE 6

In a manner similar to that described in Example 1, a buffer of tris(hydroxymethyl)aminomethane was used (pH 7.8), avidin was added at 3.0 mg/mL, and sodium cyanoborohydride was added at 30.0 mg/mL:
Characteristics of resin obtained:
Avidin monomer capacity (calc) = 43 nmoles/mL

EXAMPLE 7

Preparation of Protein Samples/Purification by Affinity Chromatography

A. Recombinant Biotinyl Subunit from *E. Coli*

A crude extract was prepared by passing a suspension of cells (10 g of CSR26 *E. coli* which over express the $1.3S_e$ subunit) in Buffer A (100 mM ammonium bicarbonate, 1.0 mM ethylenediamine tetraacetate disodium salt, 2.0 mM PMSF (phenylmethylsulfonyl fluoride), 0.01% sodium azide, and 1.0 mM DTT (dithiothreitol), pH 8.3) through a French Press or by lysis by sonication. This procedure was carried out twice and the cell debris removed by centrifugation. The clear supernatant was treated with streptomycin sulfate to remove nucleic acids and then fractionated by differential ammonium sulfate saturation. The resulting protein pellet from the 30-60% ammonium sulfate saturation contained the biotinylated $1.3S_e$ proteins and was dissolved in 14 mL of Buffer A. This solution was then dialyzed against Buffer B (100 mM potassium phosphate, 0.15M sodium chloride, pH 6.8).

B. Transcarboxylase Biotinyl Subunit from *Propionibacterium Shermanii*

A crude extract of transcarboxylase was prepared as described by H. G. Wood, B. Jacobson, B. I. Gerwin, and D. B. Northrup in Methods Enzymol., 13, 215-231 (1969).

EXAMPLE 8

Purification of Biotinylated $1.3S_e$ Subunit and Transcarboxylase from Crude Extracts A. General Method High Peformance Liquid Chromatography (HPLC) was used to characterize the quality of separation and recovery of the proteins and peptides after the crude extracts were subjected to affinity chromatography: Shimadzu HPLC system with a variable wavelength detector (monitored at 220 nm). Other chromatographic methods were optionally employed to further characterize the purification of the crude extracts: reverse phase HPLC (Synchropak RP-C4 column, 0.1% trifluoroacetic acid (TFA)/water and 0.1% TFA/acetonitrile solvent system); hydrophobic interaction chromatography (HI-HPLC) using a Progel-TSK Ether 5PW (Supelco, Inc.) column with a two solvent system (2.0M ammonium sulfate in 100 mM potassium phosphate buffer (pH 6.8) and 100 mM potassium phosphate buffer (pH 6.8)).

The binding capacities of various avidin affinity columns were evaluated by equilibrating the column with Buffer B (described in Example 7) and saturating the column by multiple injections of known concentrations of crude extracts (described in Example 7). The columns were next washed extensively with Buffer B until the absorbencies of the eluates at 220 nm were reduced to 0.01 OD (optical density). The columns were then washed with Buffer C (100 mM glycine-HCl buffer, pH 2.0) to elute previously bound $1.3S_e$ biotinyl subunit. SDS-PAGE was used to verify identity of the subunit.

B. Affinity Chromatography Columns Evaluated

A column prepared according the present invention (Example 1), designated Avidin-HPLC, and one representing prior art technology, designated Avidin-Agarose (Sigma Chemical Co., subunit of avidin attached to 4% crosslinked agarose beads) were evaluated side by side.

C. Column Performance (recombinant $1.3S_e$ subunit from *E. coli*)

The biotin and protein contents of the fractions eluted with Buffer C using the affinity medium of the present invention (Avidin-HPLC) and a conventional affinity medium (Avidin-Agarose) were determined by the aforementioned methods. Bed volumes used were 1.26 and 5.0 mL for the Avidin-HPLC and Avidin-Agarose columns, respectively; flow rates used were 1.0 mL/min.

Operating conditions for the affinity columns included several important parameters. Prewashing the columns prior to loading was typically required: equilibration with 4 bed volumes of 100 mM potassium phosphate buffer (pH 6.8) containing 150 mM sodium chloride and biotin (1.0 mg/mL), followed by elution with 10 bed volumes of Buffer C, these conditions were also used to regenerate new or stored columns.

Loading the protein sample was considered complete when column washes gave absorbance values of less than 0.05 OD for the Avidin-Agarose column and 0.01 OD for the Avidin-HPLC column. Elution of the bound proteins was accomplished with Buffer C and absorbance readings were again used to determine endpoints for the elution process. Repeated use of the same column resulted in significant differences between the two types of columns: column shrinkage for the Avidin-Agarose system and a steady decrease in binding capacity over 6 cycles whereas no shrinkage was observed for the Avidin-HPLC column over 10-15 cycles with no reduction in binding capacity.

The binding capacity of the Avidin-HPLC column was 4 times greater than that of the conventional Avidin-Agarose column and could be operated 6 times faster (40 min versus 4 hrs per cycle, after prewash). No degradation of the Avidin-HPLC column's capacity was observed over the lifetime of these studies whereas the conventional resin was less than 50% of initial capacity after 6 cycles. A summary of the results using the recombinant biotinyl subunit from E. coli can be found in Table 8C.

TABLE 8C

| Column: | Avidin-HPLC | Avidin-Agarose |
|---|---|---|
| Total protein capacity (1.3S subunit, nmoles/mL) | 42 | 11 |
| Fraction of capacity as biotinylated 1.3$S_e$ subunit | 0.28 | 0.28 |
| Operation Times (min): | | |
| Prewash | 25 | 125 |
| Load/wash | 15 | 120 |
| Elution | 15 | 60 |
| Regeneration | 10 | 60 |
| Relative binding capacity after six regeneration cycles (1.0 = no change): | 1.0 | 0.42 |
| Storage Stability (Water, 25° C.): | Stable | Unstable** |

**recommended storage in 10 mM sodium phosphate buffer (pH 6.8), 50% glycerol, 150 mM sodium chloride and 0.02% sodium azide at −20° C.

D. Column Performance (isolation of transcarboxylase containing the 1.3$S_e$ subunit from P. shermanii)

Purification of the biotinyl enzyme, trans-carboxylase from extracts of (P. shermanii), was attempted in the same manner as that of the recombinant 1.3$S_e$ subunit from E. coli. However, in this case none of the enzyme was recovered by using the conventional known resin (Avidin-Agarose) while 25 to 50% pure enzyme was achieved by using the Avidin-HPLC resin. Table 8D summarizes performance characteristics of the two resins with regard to P. shermanii transcarboxylase enzyme purification.

TABLE 8D

| Column: | Avidin-HPLC | Avidin-Agarose |
|---|---|---|
| Total protein capacity (1.3$S_e$ subunit, nmoles/mL) | 42 | — |
| Specific activity of recovered enzyme (μmoles/min/mg protein) | 8-16** | 0 |

**30 μmoles/min/mg protein is equivalent to 100% pure transcarboxylase

E. Discussion of Results

Table 8C summarizes the capacity (1.3$S_e$ subunit from E. coli) and operation time advantages of the avidin affinity medium of the present invention.

Table 8D summarizes the enrichment in purity achieved during the isolation of transcarboxylase enzyme (P. shermanii) using the avidin affinity medium of the present invention. In contrast, the conventional Avidin-Agarose medium does not provide any enrichment at all.

The following specific examples illustrate variations in the syntheses of the novel ligand-containing media of the invention. In particular, acrylic backbone polymers containing formyl (—CHO) groups can be made by the technique of A. Kanamori et al., described in J-Chromatography, 363 231-242 (1986); this procedure was used in Examples 9 and 10 which follow:

EXAMPLE 9

Preparation of Formyl Group (CHO) Containing Substrate

Based on Acrylic Backbone Polymer

AF-epoxy Toyopearl (TM) 650M resin (dry, 45-90 microns, 10.0 g) containing 89 μmoles/g of epoxy groups, was added to a mixture of 5.0 g of dextrose (glucose) and 40 mL of 0.1M sodium hydroxide in a 4-oz jar. The closed container was then incubated at 40C for 24 hrs in a heater/shaker apparatus (200 rpm). The resultant resin was placed in a column, washed thoroughly with water and transferred to a 4-oz jar. Sodium periodate solution (0.1M, 15 mL) was then added and the resultant mixture shaken in an ice bath for 1 hr. The beads were washed with water on a Buchner funnel and then incubated in 25 ml of 0.1M HCl at 25 C. for 30 min in a heater/shaker apparatus. The beads were finally washed thoroughly with water; formyl group analysis indicated a —CHO content of 55 μmoles/g (dry resin).

EXAMPLE 10

Preparation of Formyl Group (CHO) Containing Substrate Based on Acrylic Backbone Polymer In a manner similar to Example 9, 10.0 g of AF-epoxy Toyopearl TM 650M resin was mixed with 100 g of 0.1M sodium hydroxide solution containing 0.020 g sodium borohydride in an 8-oz jar. The mixture was incubated at 40 C. in a heater/shaker apparatus (200 rpm) for 24 hrs. The resultant resin was placed in a column, washed thoroughly with water and transferred to a 4-oz jar. Sodium periodate solution (0.1M, 15 mL) was then added and the resultant mixture shaken in an ice bath for 1 hr. The beads were washed with water on a Buchner funnel and then incubated in 25 mL of 0.1M HCl at 25 C. for 30 min in a heater/shaker apparatus. The beads were finally washed thoroughly with water; formyl group analysis indicated a —CHO content of 55 μmoles/g (dry resin).

EXAMPLE 11

Preparation of Formyl Group (CHO) Containing Substrate based on Styrenic Backbone Polymer A. Copolymer Composition A macroporous copolymer containing chloromethyl groups was prepared by suspension polymerization of 55% vinylbenzyl chloride (VBC), 36% divinylbenzene (DVB), 9% ethylvinylbenzene (EVB); pentanol (40% vol) and toluene (20% vol) were used as porogens (phase extender). The product copolymer contained 8.2% Cl.

B. Conversion to Formyl Group Containing Polymer

Using a procedure described by J. T. Ayres and C. K. Mann in *Journal of Polymer Science, Polymer Letters*, 3, 505-508 (1965), the chloromethyl groups of the styrenic copolymer were converted to formyl (—CHO) groups by dimethylsulfoxide (DMSO) oxidation. Ten grams of the chloromethylated resin (described above) was mixed with 14 grams of sodium bicarbonate in 200 mL of DMSO at 155 C. for 6 hrs. The product was filtered, washed with DMSO, hot water, and acetone, and dried at 100 C. under vacuum.

EXAMPLE 12

Preparation of Formyl Group Containing Substrate Based on Styrenic Backbone Polymer A. Copolymer Composition In a manner similar to Example 11, a macroporous copolymer of the following composition was prepared: 29 VBC/38 DVB/9 EVB/24 Styrene (S) with porogen levels the same as Example 11. The product copolymer contained 5.4% Cl.

B. Conversion to Formyl Group Containing Polymer

In a manner similar to Example 11, the above chloromethylated copolymer was converted to the formyl derivative.

EXAMPLE 13

Preparation of Formyl Group (CHO) Containing Substrate Based on Styrenic Backbone Polymer A. Copolymer Composition In a manner similar to Example 11, a macroporous copolymer of the following composition was prepared: 15 VBC/39 DVB/10 EVB/36 S with porogen levels the same as Example 11. The product copolymer contained 2.7% Cl.

B. Conversion to Formyl Group Containing Polymer

In a manner similar to Example 11, the above chloromethylated copolymer was converted to the formyl derivative.

EXAMPLE 14

Preparation of Formyl Group (CHO) Containing Substrate Based on Styrenic Backbone Polymer A. Copolymer Composition In a manner similar to Example 11, a macroporous copolymer of the following composition was prepared: 7 VBC/40 DVB/10 EVB/43 S with porogen levels the same as Example 11. The product copolymer contained 1.6% Cl.

B. Conversion to Formyl Group Containing Polymer

In a manner similar to Example 11, the above chloromethylated copolymer was converted to the formyl derivative.

I claim:

1. A novel ligand-containing medium for chromatographic adsorption comprising a crosslinked organic polymer having covalently bonded thereto through a chemically stable, non-hydrolyzable linking group an avidin polypeptide ligand in the dissociated renatured form wherein the avidin ligand is predominantly in a monomeric form which binds with biotin to form a complex with a dissociation constant of not less than about $10^{-10}$ Molar and wherein the crosslinked organic polymer is capable of maintaining the avidin ligand in the monomeric form.

2. The medium of claim 1 wherein the non-hydrolyzable linking group is a carbon-nitrogen group or a sulfur-nitrogen group.

3. The medium of claim 1 wherein the non-hydrolyzable linking group is selected from the group consisting of —CH$_2$NH—, —CONH—, —NHC(O)NH—, —C(O)NHNHC(O)NH— and SO$_2$NH.

4. The medium of claim 3 wherein the avidin ligands are attached through the linking groups to a crosslinked organic polymer.

5. The medium of claim 1 wherein the crosslinked organic polymer is a porous adsorbent or ion exchange resin in particulate form.

6. The medium of claim 5 wherein the crosslinked organic polymeric adsorbent or ion exchange resin in particulate form is derived primarily from an acrylic or styrenic monomer.

7. The medium of claim 1 wherein the avidin affinity group is in a monomer form which binds with biotin to produce a complex with a dissociation constant of not less than $10^{-9}$ molar.

8. An affinity chromatographic column which comprises a tubular container with inlet and outlet means at opposite ends of the tube and having fixed within the tube the novel ligand-containing medium of claim 1.

9. A method for isolating synthetic or natural molecules from a fluid mixture containing the same wherein the molecules have an affinity for avidin, or may be biotinylated to have an affinity for avidin or their recombinant versions having affinity for avidin or biotinylated recombinant versions which comprises passing the fluid mixture into intimate contact with the ligand containing medium of claim 1 and subsequently eluting the adsorbed synthetic or natural molecules from the ligand containing medium.

10. The method of claim 9 wherein the fluid mixture is an organic or aqueous liquid mixture.

11. The method of claim 9 wherein the synthetic or natural molecules consist of peptides, proteins, nucleotides, oligonucleotides, or recombinant or biotinylated or recombinant-biotinylated versions thereof.

12. The method of claim 9 where the fluid mixture containing the synthetic or natural molecules is contacted with the ligand-containing medium of claim 1 contained within a chromatographic column.

13. The method of claim 9 wherein a liquid mixture of synthetic or natural molecules is separated by liquid affinity chromatography in a column comprising the medium of claim 1.

* * * * *